United States Patent [19]

Gedwill et al.

[11] 4,451,496

[45] May 29, 1984

[54] COATING WITH OVERLAY METALLIC-CERMET ALLOY SYSTEMS

[75] Inventors: Michael A. Gedwill, North Olmsted; Stanley R. Levine; Thomas K. Glasgow, both of Rocky River, all of Ohio

[73] Assignee: The United States of America as represented by the Administrator of the National Aeronautics and Space Administration, Washington, D.C.

[21] Appl. No.: 456,460

[22] Filed: Jan. 7, 1983

Related U.S. Application Data

[62] Division of Ser. No. 403,378, Jul. 30, 1982, Pat. No. 4,446,199.

[51] Int. Cl.³ .............................................. B05D 1/08
[52] U.S. Cl. ...................................... 427/34; 427/405; 427/419.2; 428/632
[58] Field of Search ............. 427/34, 423, 405, 419.2, 427/629; 428/632, 678, 679, 682

[56] References Cited

U.S. PATENT DOCUMENTS

| | | | |
|---|---|---|---|
| 3,864,093 | 2/1975 | Wolfla | 428/652 |
| 3,890,456 | 6/1975 | Dils | 428/670 |
| 4,005,989 | 2/1977 | Preston | 428/678 |
| 4,101,713 | 7/1978 | Hirsch et al. | 428/554 |
| 4,124,737 | 11/1978 | Wolfla et al. | 428/679 |
| 4,145,481 | 3/1979 | Gupta et al. | 428/678 |
| 4,198,442 | 4/1980 | Gupta et al. | 427/34 |
| 4,248,940 | 2/1981 | Goward et al. | 428/633 |
| 4,303,737 | 12/1981 | Litchfield et al. | 428/406 |
| 4,314,007 | 2/1982 | Gessinger | 428/614 |
| 4,330,575 | 5/1982 | Litchfield et al. | 75/252 |

FOREIGN PATENT DOCUMENTS 1352319  5/1974  United Kingdom ............... 428/632

Primary Examiner—John H. Newsome
Attorney, Agent, or Firm—Norman T. Musial; John R. Manning; Gene E. Shook

[57] ABSTRACT

A base layer of an oxide dispersed, metallic alloy (cermet) is arc-plasma sprayed onto a substrate, such as a turbine blade, vane, or the like, which is subjected to high temperature use. A top layer of an oxidation, hot corrosion, erosion resistant alloy of nickel, cobalt, or iron is then arc-plasma sprayed onto the base layer. A heat treatment is used to improve the bonding. The base layer serves as an inhibitor to interdiffusion between the protective top layer and the substrate. Otherwise, the protective top layer would rapidly interact detrimentally with the substrate and degrade by spalling of the protective oxides formed on the outer surface at elevated temperatures.

19 Claims, 5 Drawing Figures

COATING WITH OVERLAY METALLIC-CERMET ALLOY SYSTEMS

DESCRIPTION

Origin of the Invention

The invention described herein was made by employees of the U.S. Government and may be manufactured and used by or for the Government for governmental purposes without the payment of any royalties thereon or therefor.

STATEMENT OF COPENDENCY

This application is a division of application Ser. No. 403,378 which was filed July 30, 1982 now U.S. Pat. No. 4,446,199.

TECHNICAL FIELD

This invention relates to protective coating systems for metallic surfaces that are subjected to high temperature uses, such as the surfaces of turbine blades, vanes, and the like. The useful lives of current and new nickel and cobalt base superalloys in hot section air foils of advanced gas turbine engines are often limited by coating wearout. The new oxide dispersion strengthened (ODS) superalloys have the strength potential for thousands of hours of use at temperatures up to 1200° C. The major limiting factors are oxidation and hot corrosion.

Even though the endurance of these alloys has been improved by coating processes which utilize aluminide diffusion coatings and single-step overlay coatings, only interim short-term solutions to the problems have been obtained. The protection ability of these coatings rapidly degrades at temperatures contemplated for advanced jet engines primarily because of diffusional instability between the coating and an oxide dispersion strengthened substrate. It has been found that protective coating of alloys containing aluminum over substrates of superalloys containing no aluminum were degraded because aluminum from the coating diffused into the substrate.

BACKGROUND ART

Gupta et al U.S. Pat. No. 4,145,481 discloses a process for producing elevated temperature corrosion resistant metal articles. This process employs an overlay of a ductile alloy of a composition normally resistant to corrosion at elevated temperatures and a corrosion-resistant outer layer of aluminide or metal. The article is then heat treated at high pressure to eliminate coating porosity.

Gupta et al U.S. Pat. No. 4,198,442 is directed to a method for producing metal articles that are resistant to corrosion at elevated temperatures. The method utilizes a ductile inner layer of a cobalt, iron, or nickel alloy and an outer layer that is highly resistant to corrosion at elevated temperatures. The inner and outer layers form a composite coating.

In Hirsch et al U.S. Pat. No. 4,101,713 a superalloy substrate is flame sprayed with powders of chromium mechanically alloyed with at least one element selected from iron, cobalt, and nickel to form a single layer coating. This coating may contain aluminum, carbon, yttrium, or the rare earth elements. In an alternate embodiment the coating powders include from about 0.5 to about 5 percent by volume of dispersed particles for dispersion strengthening.

Goward et al U.S. Pat. No. 4,248,940 describes a thermal barrier coating system for nickel- and cobalt-base superalloys which comprises a zirconia-based ceramic that is applied over an alloy of chromium, aluminum, and yttrium with materials selected from a group including iron, cobalt, nickel, and nickel-cobalt. The ceramic material is a thermal barrier coating while the alloy is a bond coating. The materials of the bond coating and thermal barrier coating are graded from the surface of the superalloy substrate to the outer surface of the ceramic coating.

Gessinger U.S. Pat. No. 4,314,007 is concerned with producing a composite shaped article consisting of a reinforced core of a heat resistant oxide-dispersion hardened metal or alloy which is encapsulated within and bonded to a heat resistant metal or alloy cladding.

DISCLOSURE OF INVENTION

According to the present invention a substrate is coated with a base coating of an oxide dispersed, metallic alloy (cermet). A top coating of an oxidation, hot corrosion, erosion resistant alloy of nickel, cobalt, or iron is then deposited on the base coating. A heat treatment is used to improve the bonding.

The base coating serves as an inhibitor to interdiffusion between the protective top coating and the substrate. Otherwise, the protective top coating would rapidly interact detrimentally with the substrate and rapidly degrade by spalling of the protective oxides formed on the outer surface at elevated temperatures. However, a top coating successfully applied in accordance with the present invention yields an excellent diffusionally stable, protective covering.

BRIEF DESCRIPTION OF THE DRAWINGS

The details of the invention will be more fully described when taken with the accompanying drawings in which.

BEST MODE FOR CARRYING OUT THE INVENTION

Figure 1:
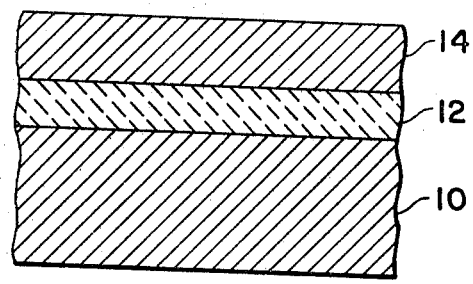
FIG. 1 is a vertical sectional view of an overlay metallic-cermet alloy coating system constructed in accordance with the present invention.

Referring now to FIG. 1 there is shown a substrate 10 that is coated in accordance with the present invention. The substrate 10 is preferably of a nickel- or cobalt-base superalloy that is to be used in hot section air foils of gas turbine engines.

A base coating 12 is initially deposited on the substrate 10. The base coating 12 comprises an intermediate layer of an oxide dispersed, metallic alloy (cermet) selected from the group consisting of nickel-, cobalt-, and iron-base alloys and a refractory oxide.

A top coating 14 is subsequently deposited on the base coating 12. The top coating 14 comprises an oxidation/hot-corrosion/erosion resistant alloy selected from the group consisting of nickel-, cobalt-, and iron-base alloys.

The coated substrate is then heat treated to improve bonding. This heat treatment comprises heating the coated substrate at 1080° C. for four hours in an inert atmosphere.

For optimum protection the matrices of the top coating 14 and base coating 12 should have a stable, fine grain structure. Also the thickness of the top coating 14 should be in the range of 50% to 70% of the total thickness of the combined top coating 14 and base coating 12.

Both the base coating 12 and the top coating 14 are preferably applied by arc-plasma spraying the coating powders in ambient air at arc gas velocities in the range of subsonic to Mach 2.0. Alternately, the coatings 12 and 14 may be plasma sprayed in a chamber with either an inert gas or a vacuum environment. It is further contemplated that the coating powders may be arc-plasma sprayed in a reactive gas environment.

The cermet powders for the base coating are prepared using a mechanical alloying process of the type described in the aforementioned U.S. Pat. No. 4,101,713 to Hirsch et al. The volume percent of the dispersed oxide in the cermet coating is in the range of about 10% to about 75%. All other compositions are expressed in weight percents.

An oxide dispersion strengthened superalloy having a nominal composition of Ni-20Cr-1.4Fe-2$Y_2O_3$ and known commercially as MA-754 was coated in accordance with the present invention. The coating system 30 consisted of a base coating of Ni-11Cr-6Al-0.3Y-40$Y_2O_3$ covered by a Ni-18Cr-12Al-0.3Y top coating. This superalloy protected by the alloy plus cermet coating was subjected to a cyclic furnace oxidation test at 1150° C. The coating remained adherent throughout the test. The specific weight change in milligrams per square centimeter plotted against exposure time in hours is illustrated by the line 20 in FIG. 2.

Two other coatings were applied and similarly tested. The first coating was aluminized electron-beam physical vapor-deposited Ni-20Cr-5Al-0.3Y. This coating remained adherent throughout the test. The results of this test are shown in line 22 of FIG. 2. Similarly, an electron-beam physical vapor deposited Ni-18Cr-12Al-0.3Y coating was tested. The coating blistered during the test. The results of this coating test are shown in line 24 of FIG. 2.

Figure 2:
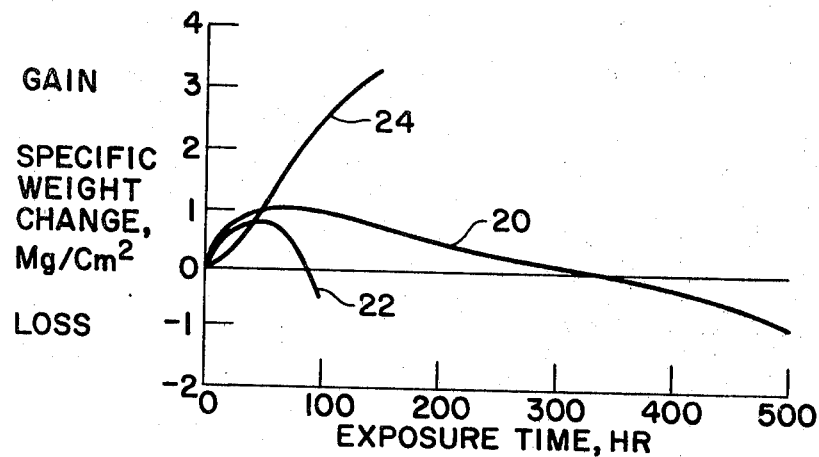
FIG. 2 is a graph of cyclic furnace oxidation of a coated superalloy.

The results illustrated in FIG. 2 show that the alloy plus cermet coating provides cyclic furnace oxidation protection for Ma-754 of over 500 hours at 1150° C. compared to about 100 hours for the other two coatings. This is about a 5-fold improvement.

Figure 3:
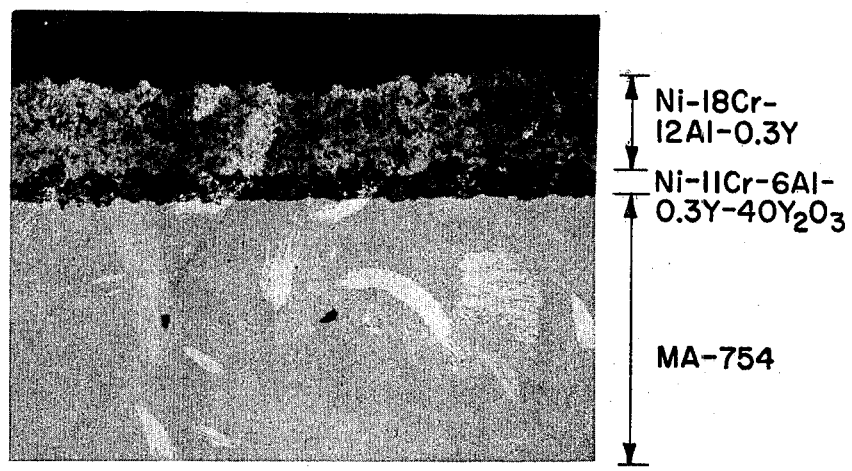
FIG. 3 is a photomicrograph at 100X magnification of a sprayed and heat treated coating system before furnace oxidation.
Figure 4:
FIG. 4 is a photomicrograph at 100X magnification of the coating system shown in FIG. 3 after it has been cyclic furnace oxidized.

FIGS. 3 and 4 show typical cross-sectional microstructures before and after furnace oxidation. Both photomicrographs are of arc-plasma sprayed Ni-18Cr-12Al-0.3Y plus Ni-11Cr-6Al-0.3 Y-40$Y_2O_3$ on a MA-754 substrate. The photomicrographs are at 100X magnification. A comparison of FIG. 3 which is after the substrate was sprayed and heat treated for four hours at 1080° C. in argon and FIG. 4 which is after the coated substrate was cyclically furnace oxidized for 500 hours at 1150° C. indicates that no serious coating degradation had occurred during the 500 hour oxidation test.

Figure 5:
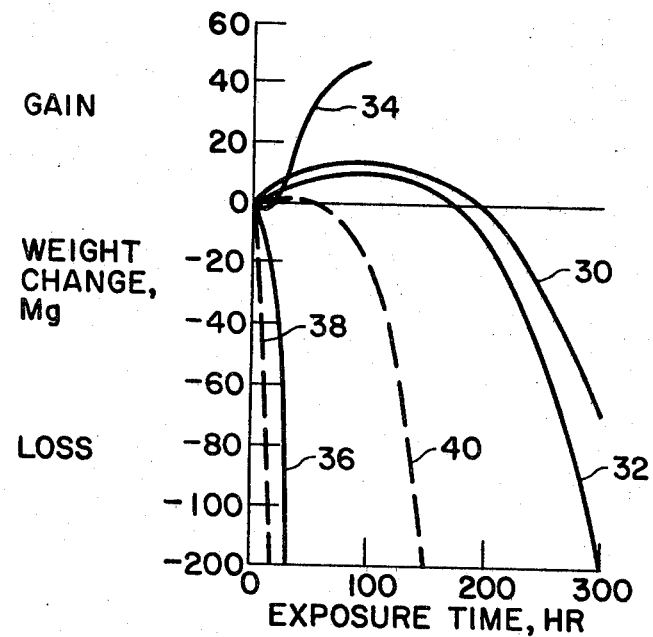
FIG. 5 is a curve showing cyclic Mach 0.3 burner rig oxidation of coated and uncoated superalloys.

Several coatings on oxide dispersion strengthened superalloys were also evaluated in cyclic oxidation at 1150° C. in a Mach 0.3 burner rig which simulates a jet engine environment. The burner rig results plotted as weight change against exposure time for coated and uncoated oxide dispersion strengthened superalloys are shown in FIG. 5. The test results for an arc plasma sprayed Ni-18Cr-12Al-0.3Y plus Ni-17Cr-10Al-0.5Y-9$Y_2O_3$ coating on an MA-754 substrate are shown in line 30.

The test results of an arc plasma sprayed Ni-18Cr-12Al-0.3Y coating on an MA-754 substrate are shown in line 32. The line 34 sets forth the results of an electron beam physical vapor deposited Ni-18Cr-12Al-0.3Y coating on MA-754. This coating blistered after a relatively short exposure time. Line 36 show the results of testing uncoated MA-754.

Line 38 illustrates the results of testing an uncoated substrate of commercially-known MA-755 E. This material has a nominal composition of Ni-15Cr-4.5Al-5.5W-3.5Mo-3Ti-2.5 Ta-1.1$Y_2O_3$. The same substrate coated with a commercial aluminized coating is shown in line 40.

It is evident the alloy plus cermet coating provided at least 250 hours of cyclic oxidation protection in the burner rig. Compared to one of the best commercial aluminide coatings, shown in line 40, the alloy plus cermet coating of line 30 showed about a 150-hour improvement. By increasing the oxide content about 9 weight percent in the cermet coatings, significant improvements are expected.

Although the preferred embodiment of the invention has been disclosed and described it will be appreciated that various modifications may be made to the coating system without departing from the spirit of the invention or the scope of the subjoined claims. It should also be recognized that the invention can be used as the bond coating system in what is known as a thermal barrier coating.

We claim:

1. A method of coating nickel-base and cobalt-base alloy substrate surfaces comprising the steps of
    forming cermet powders by mechanically alloying elemental metallic powders selected from the group consisting of nickel-base, cobalt-base and iron base alloy constituents and refractory oxide powders,
    arc-plasma spraying said cermet powders onto said surfaces to form a base coating having said refractory oxide dispersed therein, said dispersed oxide comprising between about 10 volume percent and about 75 volume percent of said base coating,
    arc-plasma spraying powders of an alloy selected from the group consisting of nickel-base, cobalt-base, and iron base alloys onto said base coating to form an oxidation, hot corrosion, erosion resistant top coating, and
    heat treating the coated substrate to improve the bonding of the base coating and the top coating to said substrate.

2. A method of coating alloy substrate surfaces as claimed in claim 1 wherein the coated substrate is heat treated at about 1080° C. in argon for about four hours.

3. A method of coating alloy substrate surfaces as claimed in claim 1 wherein the coating powders are arc-plasma sprayed in an ambient air environment.

4. A method of coating alloy substrate surfaces as claimed in claim 1 wherein the coating powders are arc-plasma sprayed in an inert gas environment.

5. A method of coating alloy substrate surfaces as claimed in claim 1 wherein the coating powders are arc-plasma sprayed in a vacuum environment.

6. A method of coating alloy substrate surfaces as claimed in claim 1 wherein the coating powders are arc-plasma sprayed in a reactive gas environment.

7. A method of protecting a metallic substrate from oxidation, hot corrosion and erosion at high temperatures at which diffusional instability is exhibited between a metallic alloy coating and said substrate wherein said metallic alloy coating interacts detrimentally with said substrate, said method comprising the steps of
   depositing a base coating of an oxide dispersed, metallic alloy on said substrate to inhibit diffusion of coating material into said substrate, and
   depositing a top coating of an oxidation, hot-corrosion, erosion resistant alloy on said base coating.

8. A method of protecting a metallic substrate as claimed in claim 7 wherein the substrate is a metal selected from nickel-base superalloys and cobalt-base superalloys.

9. A method of protecting a metallic substrate as claimed in claim 8 wherein the base coating is deposited by arc-plasma spraying powders selected from the group consisting of nickel-base, cobalt-base, and iron-base alloys containing a dispersed oxide onto a surface of said substrate.

10. A method of protecting a metallic substrate as claimed in claim 9 including the step of
    mechanically alloying the powders prior to arc-plasma spraying the base coating.

11. A method protecting a metallic substrate as claimed in claim 10 wherein the dispersed oxide comprises between about 10 and about 75 volume percent of said base coating.

12. A method of protecting a metallic substrate as claimed in claim 9 wherein the top coating is deposited by arc-plasma spraying powders selected from the group consisting of nickel-base, cobalt-base, and iron-base alloys onto said first layer.

13. A method of protecting a metallic substrate as claimed in claim 12 wherein the powders of the base coating and top coating are arc plasma sprayed in an ambient air environment.

14. A method of protecting a metallic substrate as claimed in claim 12 wherein the powders of the base coating and top coating are arc plasma sprayed in an inert gas environment.

15. A method of protecting a metallic substrate as claimed in claim 12 wherein the powders of the base coating and top coating are arc plasma sprayed in a vacuum environment.

16. A method of protecting a metallic substrate as claimed in claim 12 wherein the powders of the base coating and top coating are arc plasma sprayed in a reactive gas environment.

17. A method protecting a metallic substrate as claimed in claim 9 including the step of heat treating the coated substrate to improve the bonding of the base coating and top coating to said substrate.

18. A method of protecting a metallic substrate as claimed in claim 17 wherein the coated substrate is heat treated at about 1080° C. in argon.

19. A method of protecting a metallic substrate as claimed in claim 18 wherein the coated substrate is heat treated for about four hours.

* * * * *